Aug. 13, 1957  T. W. ANDERSON  2,802,247
WEATHER STRIP FOR HINGED DOORS
Filed July 6, 1956
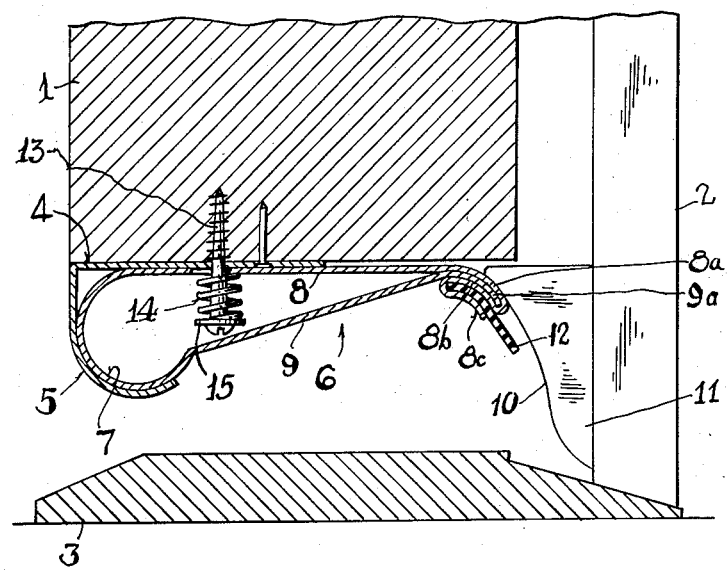
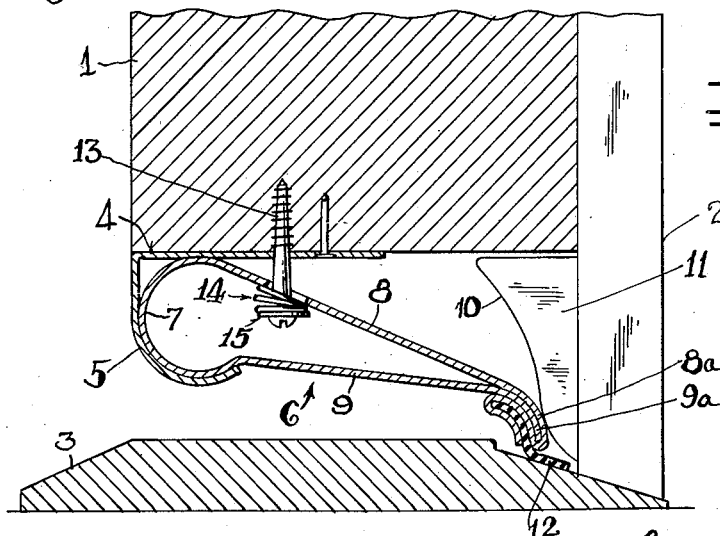
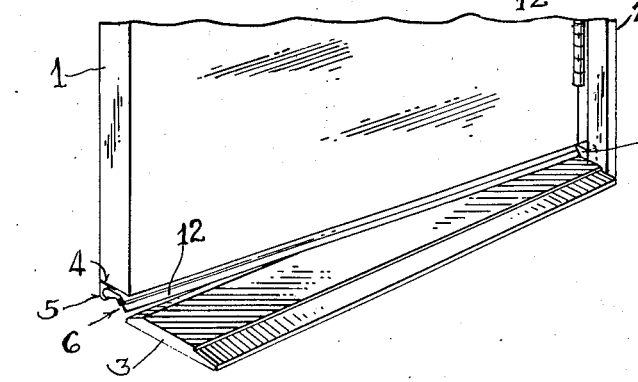
INVENTOR.
THOMAS W. ANDERSON
BY
ATTORNEY

United States Patent Office 2,802,247
Patented Aug. 13, 1957

2,802,247

WEATHER STRIP FOR HINGED DOORS

Thomas W. Anderson, Red Bluff, Calif.

Application July 6, 1956, Serial No. 596,180

1 Claim. (Cl. 20—67)

This invention relates to attachments for hinged doors, and more particularly to an improved weather strip adapted for use on doors to prevent air currents from passing beneath a closed door into a room enclosure.

My invention embodies a device in the nature of a weather strip member attached to the bottom of a hinged door, which, when the door is shut, will automatically close the space between the bottom of such door and the sill or floor beneath and thereby prevent the entrance of air currents, dust, insects, or water from the outside into the room interior. The weather strip member is mounted for up and down pivotal movement on the bottom edge of the door, and as the latter is closed, the leading edge of such weather strip member engaging with a strike element secured to the door frame is deflected downwardly to a position engaging with the sill or floor beneath, thereby closing the space below the door. The weather strip member is automatically returned to its normal position against the bottom edge of the door as the door is opened and the strike element is again disengaged.

The primary object of my invention is to provide an improved weather strip attachment for a hinged door, such attachment being adapted to function in an improved manner to automatically swing downwardly to an engaging position with the floor or sill beneath when the door is closed thereby preventing outside air from passing beneath the door, such attachment being adapted to automatically swing upwardly to a disengaging position with respect to the floor or sill when the door is opened.

Other and further objects of my invention will be pointed out hereinafter or will be indicated in the appended claim or will be obvious to one skilled in the art upon an understanding of the present disclosure. For the purpose of this application I have elected to show herein certain forms and details of a weather strip attachment for doors which is representative of my invention; it is to be understood, however, that the embodiment of my invention herein shown and described is for illustration purposes only and that therefore it is not to be regarded as exhaustive of the variations of the invention in the art.

In the accompanying drawing:

Fig. 1 is an enlarged transverse sectional view taken through the lower portion of a hinged door to which my improved weather strip device is attached, the door being partially open and the weather strip device being shown in a raised position, preparatory to its being swung downwardly by its engagement with a strike member attached to the door frame;

Fig. 2 is a similar view showing the door fully closed and the weather strip device in a lowered position engaging with the door sill beneath; and Fig. 3 is a perspective view of a fragmentary lower portion of the door, showing the weather strip device in a raised position.

Referring to the drawing, the numeral 1 designates a hinged door, 2 the door frame upon which the door is mounted for swinging movement, and 3 the sill or floor extending between the side members of the door frame. Secured as by nails, screws or other suitable means to the bottom edge of door is an elongated supporting plate 4 which has a depending curved flange 5 extending from its outer longitudinal edge. Pivotally supported by the curved flange 5 is a hollow elongated weather strip member 6 which has a length substantially equal to the width of the door and a width approximately the thickness of the door. The weather strip member 6 is preferably made from a sheet of steel or other suitable metal or plastic material, such sheet being bent so as to provide a hollow elongated semi-cylindrical member 7 at one end which is pivotally supported by the curved flange 5 of the supporting plate 4. The weather strip member 6 also comprises converging upper and lower sides 8 and 9, the inner or leading converging edge portions of such sides being curved downwardly as at 8a and 9a, respectively, to provide a rigid leading edge portion or element on the weather strip member adapted to engage with the cam surface 10 on a strike member 11 secured to the door jamb portion of the door frame 2, such strike member being positioned in the path of the rigid leading edge portion of the weather strip member when the door is closed. The leading edge portion of the upper side 8 of the weather strip member 6 extends downwardly around the end of the downwardly curved end of the lower side 9 of the weather strip member and then upwardly and outwardly as at 8b, against the curved end portion 9a and then downwardly and forwardly as at 8a. A strip 12 of flexible rubber is firmly held between the opposed curved portions 8b and 8c of the upper side 8 of the weather strip member 6, such strip being arranged to engage with the sill 3 when the weather strip member is in its lowered position, as shown in Fig. 2. The cam surface 10 of the strike member 11 is shaped so as to deflect the downwardly curved leading edge portion of the weather strip member 6 and the flexible strip 12 secured thereto in a downward direction as the door reaches a closed position, thereby pivotally actuating the weather strip member to a lowered position whereby the flexible strip firmly engages with the sill 3 (or the floor if the sill is eliminated) and closes the opening beneath the door.

So as to automatically return the weather strip member 6 to its out of the way position engaging with the bottom edge of the door as the latter is opened, I have provided suitable spring means for actuating the weather strip member upwardly as the downwardly curved leading edge portion 8a—9a thereof disengages the cam surface 10 of the strike member 11. Various arrangements of spring means may be used for this purpose, but in the embodiment shown herein I have secured a plurality of spaced screws 13 (only one being shown on the drawings) to the bottom edge of the door, such screws extending downwardly through suitable openings or slots in the plate 4 and the upper side 8 of the weather strip member 6. Spiral springs 14 (only one being shown) held under compression between the upper side 8 of the weather strip member and washers 15 abutting the upper sides of the heads of the screws 13, urge the weather strip member upwardly toward its out of the way position against the bottom edge of the door. Thus when the door is closed and the weather strip member 6 is actuated by the strike member 11 in a downward direction, the springs 14 are contracted and charged, and when the door is opened and the strike member is disengaged, the springs automatically return the weather strip member upwardly to a position engaging with or closely underlying the bottom edge of the door. The screws 13 not only serve to support the springs 14, but they also prevent the lateral displacement of the weather strip member with respect to the curved flange 5 on which the latter is supported.

What I claim is:

In a weather strip attachment for substantially vertical hinged doors, a weather strip supporting member mounted on the lower end of a swinging door, an elongated hollow weather strip member underlying the bottom edge of the door and having a length corresponding substantially to the width of the door and having a width substantially equal to the thickness of the door, the weather strip member having a semi-cylindrical longitudinal edge portion pivotally supported on the supporting structure and the weather strip member also having longitudinal upper and lower converging sides joined to the semi-cylindrical edge portion, the upper side having a plurality of longitudinally spaced openings therein, a longitudinal flexible strip secured to the converging sides of the weather strip member, a plurality of spaced projecting members depending from the bottom edge of the door and extending loosely through the openings in the upper side of the weather strip member, the said projecting members having spring engaging means on their lower ends, and tensioned compression springs positioned between the spring engaging means of the projecting members and the upper side of the weather strip member.

References Cited in the file of this patent

UNITED STATES PATENTS

| | | |
|---|---|---|
| 186,085 | Hink | Jan. 9, 1877 |
| 587,893 | Ward | Aug. 10, 1897 |
| 829,168 | McLeod | Aug. 21, 1906 |
| 1,845,320 | Myers | Feb. 16, 1932 |